INVENTORS
CARL J. BERNIER
JOSEPH R MORIN

United States Patent Office 3,284,664
Patented Nov. 8, 1966

3,284,664
PRESSURE REGULATION OF FLUORESCENT
LAMPS BY PELTIER COOLING MEANS
Joseph R. Morin, Hamilton, and Carl J. Bernier, Beverly,
Mass., assignors to Sylvania Electric Products Inc., a
corporation of Delaware
Continuation of application Ser. No. 843,740, Oct. 1,
1959. This application Feb. 6, 1964, Ser. No. 343,070
3 Claims. (Cl. 315—108)

This application, which is a continuation of our copending application, Serial No. 843,740, filed October 1, 1959, now abandoned, relates to low-pressure fluorescent lamps and apparatus for operating them, and particularly to such lamps for operation at very high inputs.

The operation of a fluorescent lamp at such outputs requires a means of cooling a small area of the lamp to a temperature at which the lamp operation is efficient. The temperature for high efficiency is about 40° C., corresponding to a mercury vapor pressure of about 10 microns.

One way of accomplishing this is by placing a shield inside the lamp, between the filament and the end of the tube. This involves a change in internal structure of the lamp and is not effective under all ambient conditions, for example under extremely cold or extremely hot ambients.

We have discovered that an efficient high output lamp can be obtained by cooling a small spot on the lamp tube by an actual refrigerating device, such as an enclosure in which a substance is evaporated at the point to be cooled and condensed elsewhere, or in which a small area of the lamp is placed in contact with a thermoelectric junction of dissimilar metals which has a voltage applied to it in a reverse direction to that which would be generated by heating the junction.

When the latter means is used, the voltage applied to it can be obtained from the source of supply for the lamp, or from some circuit element in series with the lamp, so that it will increase with the lamp current, thereby increasing the refrigerating effect as the heating effect of the lamp current increased and stabilizing the refrigerated area at a particular temperature. If the lamp is operated on alternating current, the voltage applied to the refrigerating junction can be rectified so as to be unidirectional.

In order to provide sufficient cooling, the junction can be made of metal ribbons, so that a larger area can be in contact with the lamp.

Other objects, features and advantages of the invention will be apparent from the following specification taken in connection with the attached drawing, in which.

Figure 1:
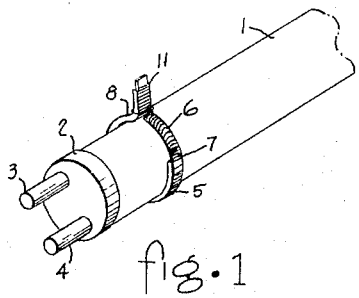
FIGURE 1 is a perspective view of a fluorescent lamp with a refrigerating tube bent partially around it.
Figure 2:
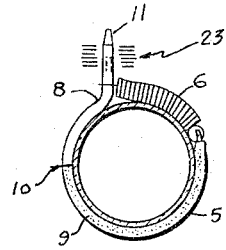
FIGURE 2 is a cross-sectional view of the same arrangement.

In FIGURE 1 the fluorescent lamp tube 1 has the usual end base 2 with two contact prongs 3, 4 extending therefrom. A piece 5 of copper tubing fits around the tube 1 at some convenient spot, preferably not directly opposite a discharge electrode, and the tube is held in close thermal and mechanical contact with it by the coiled spring 6 which extends from one end 7 of the tubing to another portion 8 on the other side of the lamp tube 1. The end 7 of the copper tubing is pinched off to form an hermetic seal, and a hole can be present in it to hold one end of the coiled spring 6. The other end of the spring can be fitted around the copper tubing so as to be held thereto.

The copper tubing should be rectangular in cross-section so that it will contact the outer surface of the tube closely.

The tubing can be bent upward at 8, as shown, to form a sort of hook-shaped piece. The tube can be filled with some suitable refrigerant 9 to the level 10 about up to the plane of the center line of the tube, and the end 11 of the tube pinched off in a hermetic seal. Metal fins 23 are attached to the tube 5 near its upper end 11 to radiate heat.

Ethylene chloride or some other suitable material can be used as the refrigerant. It will be a material suitable for vaporizing at about 40° C. and condensing in the upper arm and running back.

In operation, the heating of the lamp tube 1 can only raise the temperature of the tube by vaporizing some of the liquid 9, and the absorption of the heat of vaporization will keep the area cool.

Figure 3:
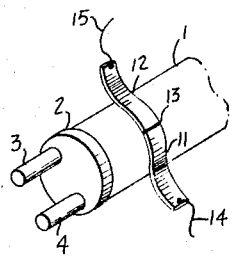
FIGURE 3 is a perspective view of a fluorescent lamp with a refrigerating junction in contact with it.
Figure 4:
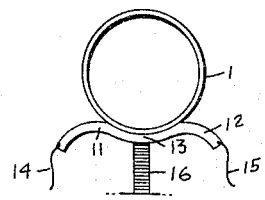
FIGURE 4 is a cross-sectional view of the same device.

In FIGURES 3 and 4, the tube 1 has the base 2 and contact prongs 3, 4 as before. Now, however, the ribbon thermoelectric junction 11–12 contacts the lamp tube surface at a suitable area, the portion 11 being of one suitable metal and the portion 12 of another, they being joined together by soldering, welding or in some other manner at 13. Wires 14, 15 may be electrically connected to ribbons 11, 12 respectively and extend through another thermoelectric junction 21, between elements 12 and 20, to a suitable source of unidirectional voltage. A spring 16 may extend from the fixture to press the thermocouple 11–12 into thermal contact with the surface of tube 1.

The junction area in contact with the lamp can be made small with efficient junction material, or can be made as large as one inch square if desired.

Figure 5:
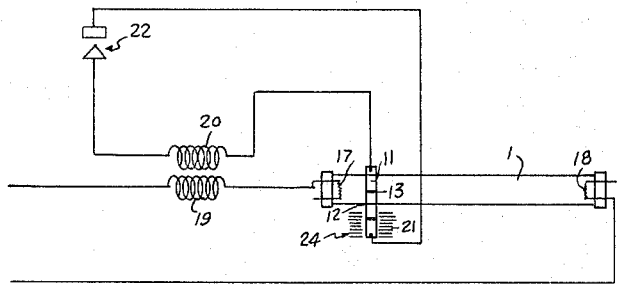
FIGURE 5 is a schematic view of a circuit arrangement for such a device.

In FIGURE 5, the tube 1, with electrodes 17, 18 at each end, connected to a power supply in series with an inductance coil 19 as a ballast, is in thermal contact with the ribbon thermoelectric junction 11–12. A second coil 20, wound around or in inductive relation to coil 19, supplies voltage to the junction 11–12 through the second thermoelectric junction 21 and rectifier 22, the voltage being in opposition to that which would be produced by the thermoelectric junction 11–12 itself on being heated.

In operation, the voltage across the thermocouple 11–12 will cool it, cooling lamp 1 also at the region of contact, and keeping it at about 40° C. As the current in lamp 1 rises, the voltage across the couple and the cooling effect will also increase, keeping the contact area at a reasonably constant temperature.

The thermoelectric junction may be made of any suitable materials, for example lead telluride as one metal, lead selenide as the other, with the junction being a solid solution of one in the other. Among the other materials suitable as an element of such junctions are antimony telluride, bismuth telluride, lead sulfide and zinc antimonide. Semi-conductors such as the above are generally more efficient than the use of metals for the thermoelectric junctions, as in the bismouth-antimony junction.

Metal cooling fins 24 are attached to the metal of junction 21 to radiate heat. The junction 21 will be the hot junction and junction 13 will be the cool junction.

Although we have described the junction as being made of ribbons, it can also be made of wire or in some other form. Various modifications in the embodiments described will be apparent to those skilled in the art without departing from the spirit and scope of the invention.

What we claim is:

1. Apparatus for operating a low pressure mercury lamp, said apparatus comprising a thermoelectric junction formed of flat ribbons to the curvature of the outer surface of the lamp, and a spring to press the junction against said outer surface of said lamp.

2. Apparatus for operating a low pressure mercury lamp from an alternating current source, said apparatus comprising: a series ballast for said lamp and a circuit operating from said ballast and including a rectifier and two thermoelectric junctions, one of said junctions being in contact with the lamp and the other being out of contact with said lamp having heat radiating means.

3. The apparatus of claim 2, in which the series ballast is a series reactor having a secondary coil to supply voltage to said circuit operating from said ballast.

References Cited by the Examiner

UNITED STATES PATENTS

| | | | |
|---|---|---|---|
| 1,110,601 | 9/1914 | Thomas | 313—12 X |
| 1,897,586 | 2/1933 | Pirani | 313—44 |
| 2,122,285 | 6/1938 | Holst et al. | 313—34 |
| 2,497,963 | 2/1950 | Singer | 313—44 X |
| 2,763,810 | 9/1956 | Hehenkamp et al. | 315—98 |
| 2,932,753 | 4/1960 | Arnott et al. | 313—44 X |
| 3,064,064 | 11/1962 | Jones | 62—3 X |
| 3,099,137 | 7/1963 | Jamison | 62—3 |
| 3,141,621 | 7/1964 | Tolbert | 240—51.11 |

JAMES W. LAWRENCE, *Primary Examiner.*

GEORGE N. WESTBY, R. SEGAL, C. R. CAMPBELL,
*Assistant Examiners.*